United States Patent

Sagona et al.

(10) Patent No.: US 9,537,307 B2
(45) Date of Patent: Jan. 3, 2017

(54) OVERVOLTAGE PROTECTION METHOD AND DEVICE

(75) Inventors: John Duward Sagona, Poplar Grove, IL (US); Vietson M. Nguyen, Rockford, IL (US); Donal E. Baker, Rockford, IL (US); Randall Bax, Rockton, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 530 days.

(21) Appl. No.: 13/186,436

(22) Filed: Jul. 19, 2011

(65) Prior Publication Data

US 2013/0021712 A1  Jan. 24, 2013

(51) Int. Cl.
*H02H 9/04* (2006.01)

(52) U.S. Cl.
CPC ...................................... *H02H 9/041* (2013.01)

(58) Field of Classification Search
USPC .................................................... 361/117, 21
See application file for complete search history.

(56) References Cited

U.S. PATENT DOCUMENTS

| | | | |
|---|---|---|---|
| 4,743,789 A | 5/1988 | Puskas | |
| 5,041,958 A * | 8/1991 | Dhyanchand et al. | ......... 363/43 |
| 5,127,085 A | 6/1992 | Becker et al. | |
| 5,130,881 A | 7/1992 | Hilland | |
| 5,245,500 A | 9/1993 | Rozman | |
| 5,287,288 A | 2/1994 | Brennen et al. | |
| 5,321,575 A | 6/1994 | Shilo | |
| 5,491,404 A | 2/1996 | Settles et al. | |
| 5,615,097 A | 3/1997 | Cross | |
| 5,734,256 A | 3/1998 | Larsen et al. | |
| 5,805,394 A * | 9/1998 | Glennon | .................. H02H 7/06 322/37 |
| 5,852,381 A | 12/1998 | Wilmot et al. | |
| 6,226,166 B1 * | 5/2001 | Gumley et al. | ............... 361/111 |
| 6,657,841 B1 * | 12/2003 | Melchert et al. | ............. 361/118 |
| 7,430,101 B2 * | 9/2008 | Komulainen et al. | ........ 361/111 |
| 7,439,874 B2 | 10/2008 | Sotiriou | |
| 7,466,109 B1 | 12/2008 | Larsen et al. | |
| 7,660,096 B2 | 2/2010 | Golubovic et al. | |
| 8,467,163 B2 * | 6/2013 | Asplund | ......................... 361/56 |
| 2003/0227733 A1 | 12/2003 | Marsh et al. | |
| 2004/0100747 A1 | 5/2004 | Vo et al. | |
| 2006/0203401 A1 * | 9/2006 | Kojori | .................. H02H 1/0015 361/42 |

(Continued)

FOREIGN PATENT DOCUMENTS

| | | |
|---|---|---|
| CN | 101944454 | 1/2011 |
| EP | 1249203 | 10/1971 |
| EP | 0462694 | 12/1991 |

OTHER PUBLICATIONS

European Search Report for European Patent Application No. 12177199.2 dated Dec. 10, 2012.
U.S. Appl. No. 13/241,996, filed Sep. 23, 2011.

*Primary Examiner* — Ann Hoang

(74) *Attorney, Agent, or Firm* — Carlson, Gaskey & Olds, P.C.

(57) ABSTRACT

An example, overvoltage protection device includes a switch and a surge protection device that is selectively activated by actuating the switch. The switch is actuated in response to a voltage. An example method of absorbing an overvoltage includes sensing a voltage, and selectively activating a surge protection device in response to the sensed voltage.

5 Claims, 2 Drawing Sheets

(56) References Cited

U.S. PATENT DOCUMENTS

| | | | |
|---|---|---|---|
| 2007/0268004 A1* | 11/2007 | Rozman | H02J 7/1438 322/37 |
| 2007/0275594 A1 | 11/2007 | Greenberg | |
| 2008/0239604 A1 | 10/2008 | Davison | |
| 2009/0046406 A1 | 2/2009 | Chan et al. | |
| 2009/0051219 A1* | 2/2009 | Kern et al. | 307/9.1 |
| 2010/0066288 A1 | 3/2010 | Williams | |
| 2010/0284114 A1 | 11/2010 | Kilroy et al. | |
| 2011/0068819 A1 | 3/2011 | Sims et al. | |

\* cited by examiner

OVERVOLTAGE PROTECTION METHOD AND DEVICE

BACKGROUND

This disclosure is related to electrical power generation, and more particularly, to overvoltage protection in an electrical power generation system.

Electrical power generating systems are well known. Electrical power generating systems produce electrical energy that is supplied to various loads. Some electrical power generating systems generate power using a generator. In aircraft electrical power generating systems, variable frequency generators are often used to supply power. Turbine engines drive the variable frequency generators.

Under some conditions, an electrical power generating system may experience an overvoltage (or voltage spike). The overvoltage can damage components powered by the electrical power generating system. Example conditions that may cause the overvoltage include suddenly removing a load, or an arc fault within the electrical power generating system. There are many strategies for limiting or containing overvoltages, but desirable overvoltage protection remains lacking.

For example, a typical overvoltage management strategy adjusts a generator exciter field current to adjust the output voltage if an overvoltage is detected. This control strategy however reacts very slow, and thus may be suboptimal if implemented. The overvoltage may cause damage due to the relatively slow and/or delayed reaction.

SUMMARY

An example, overvoltage protection device includes a switch and a surge protection device that is selectively activated by actuating the switch. The switch is actuated in response to a voltage.

An example electrical power generating system overvoltage protection arrangement includes a variable frequency generator that provides an AC voltage rectified through a rectifier to create a DC bus. An overvoltage protection device activates a surge protection device if the voltage at the DC bus exceeds a threshold value. The surge protection device is configured to absorb the DC voltage in excess of the threshold value. In one example, the surge protection device indirectly absorbs the AC voltage in excess of the threshold value.

An example method of absorbing an overvoltage includes sensing a voltage, and selectively activating a surge protection device in response to the sensed voltage.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
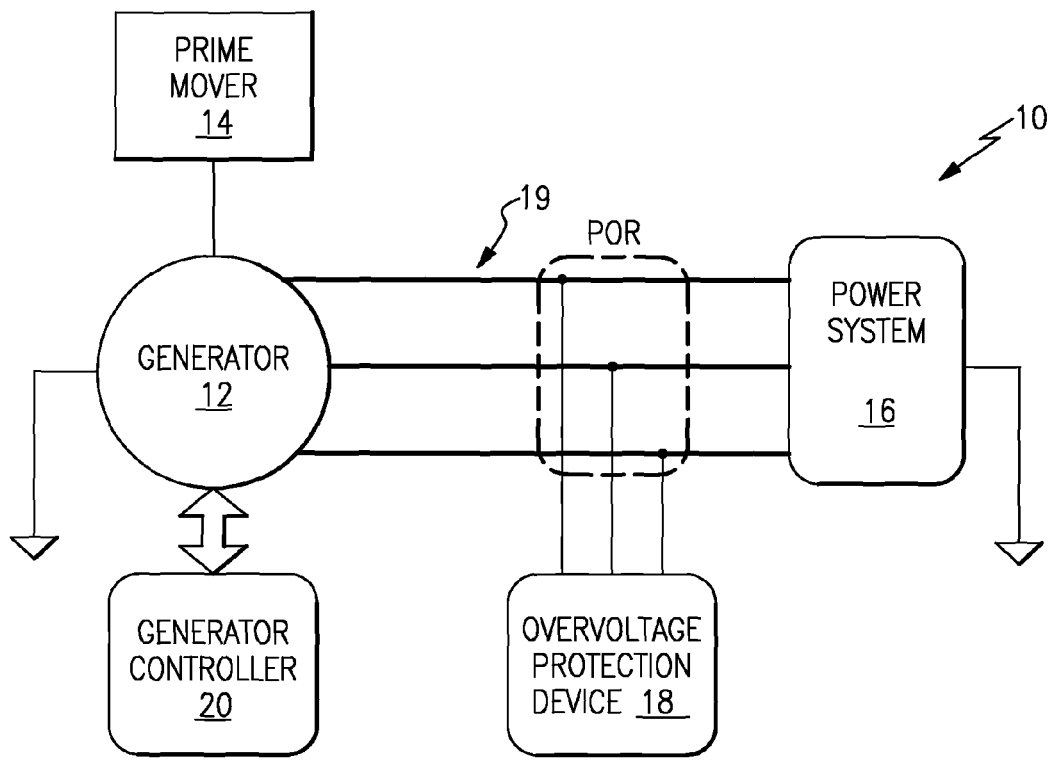
FIG. 1 shows a general schematic view of an example electrical power generating system.

Referring to FIG. 1, an example electrical power generating system 10 includes a generator 12 driven by a prime mover 14, such as a gas turbine engine of an aircraft. Other example prime movers include diesel engines, a spark-ignited engine, a natural gas engine, a hybrid engine, or another variety of engine or turbine known in the art.

The generator 12 powers an AC electrical power system 16 or some other type of load. An overvoltage protection device 18 protects the AC electrical power system 16 from overvoltage events associated with power provided by the generator 12.

The example generator 12 is a variable frequency generator that provides a three-phase AC voltage along paths 19. The generator 12 is controlled by a generator controller 20. The generator controller 20 can adjust the generator 12 to produce a higher or a lower AC voltage.

Figure 2:
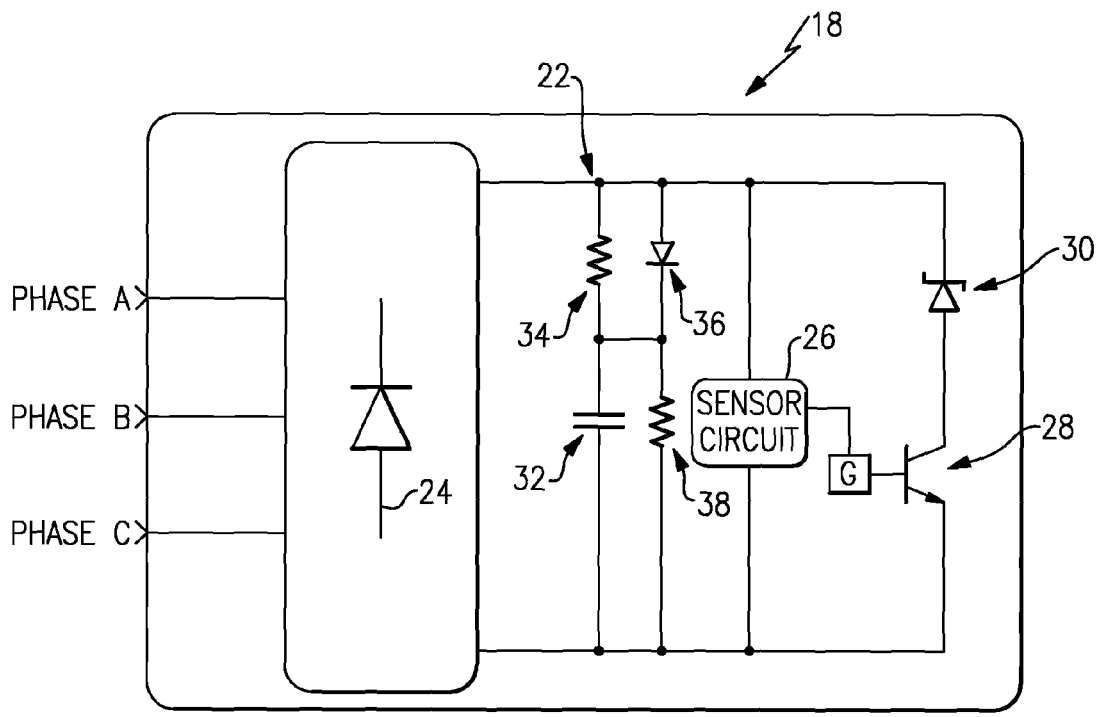
FIG. 2 shows a schematic view of an overvoltage protection device within the FIG. 1 system.

Referring now to FIG. 2 with continuing reference to FIG. 1, the paths 19 take the AC voltages (Phase A, Phase B and Phase C) from the generator 12 to a DC bus 22. A rectifier bridge 24 rectifies the three-phase AC voltages and converts the AC voltage to a DC voltage on the DC bus 22. The example bus is a 235 volt AC bus.

In this example, a sensor circuit 26 is used to measure the DC voltage on the DC bus 22. The sensor circuit 26 is configured to selectively transition a switch 28 between an on-state and an off-state using a gate drive G. The switch 28 is a power semiconductor switch in this example.

A surge protection device, such as a metal oxide varistor (MOV) 30, is activated when the switch 28 is in the on-state. The MOV 30 is deactivated when the switch 28 is in the off-state. In this example, the power switch 28 and the MOV 30 are connected in series across the DC bus 22.

The example sensor circuit 26 transitions the switch 28 to the on-state for a fixed duration of time when an overvoltage condition is detected. The duration of time the switch 28 is held in the on-state depends on the power rating of the system 10. For example, if the sensor circuit 26 detects the DC bus 22 voltage exceeding a threshold value, say 700 volts, the sensor circuit 26 transitions the switch 28 to the on-state to activate the MOV 30. When the MOV 30 is activated, the MOV 30 absorbs the energy (voltage) from the DC bus 22 in excess of 700 volts. In this example, a voltage exceeding 700 volts is considered an overvoltage condition because this voltage exceeds the threshold value. The example sensor circuit 26 maintains the switch 28 in the off-state when there is no overvoltage condition.

A person having skill in this art and the benefit of this disclosure would understand how to absorb voltage using the MOV 30. Notably, the AC power flowing into the electrical power system 16 is not interrupted when the MOV 30 is activated. Thus, the components attached to the three-phase AC electrical power system 16 are able to continue operating.

Maintaining the switch 28 in the off-state ensures that the MOV 30 is not activated when the MOV 30 is not needed to absorb the energy created by the excessive voltage, such as when there is no overvoltage condition. Selectively activating the MOV 30 thus extends the life of the MOV 30.

The size of the example MOV 30 is based on the environment and, more specifically, on how much voltage the MOV 30 may be required to absorb. A designer will typically select the smallest MOV 30 suitable for the application to save weight, for example. In practical applications, the MOV 30 is designed to fail shorted so it won't create any further damage to the system. In this case other protection means will be designed to give a second level protection not within the scope of this disclosure.

Figure 3:
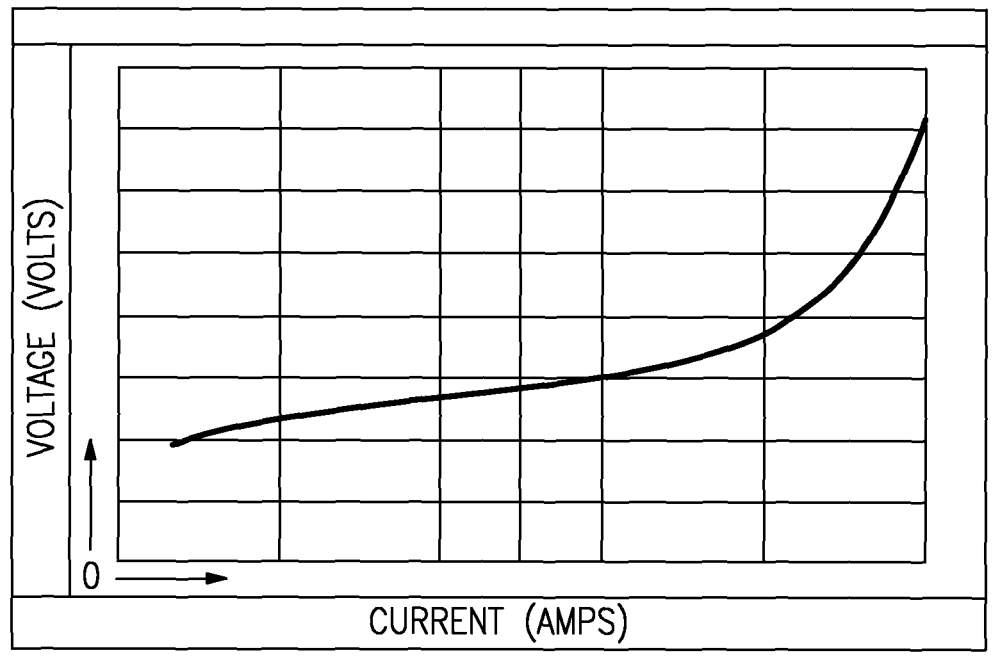
FIG. 3 graphically shows general voltage and current characteristics for a surge protection device of the FIG. 2 overvoltage protection device.

Although the example surge protection device is the MOV 30, a person having skill in this art and the benefit of this disclosure may understand other types of surge protection devices suitably for use within the overvoltage protection device 18. In general, the surge protection device is an MOV or equivalent device that has voltage and current characteristics shown in FIG. 3. That is, when the surge protection device is exposed to a voltage transient, the impedance decreases rapidly to a highly conductive circuit, thus directly clamping the DC voltage (in turn indirectly clamping the three-phase AC voltages) and absorbing the energy associated with the voltage transient.

The example overvoltage protection device 18 also includes a capacitor 32, a discharge resistor 34, a snubber diode 36, and a bleeder resistor 38. The capacitor 32 is used to filter voltage from the DC bus 22, which smoothes short-period voltage spikes by slowing the rate of change of the voltage. In one example, the capacitor 32 slows the rate of change as the voltage from the DC bus 22 moves from a typical voltage condition to an overvoltage condition. Slowing the rate of change of the voltage provides additional time for the switch 28 to be transitioned to the on-state and the MOV 30 to activate, thus preventing the protection system from false triggering. The discharge resistor 34 facilitates discharge of energy from the capacitor 32 in a known manner.

In this example, the snubber diode 36 charges the capacitor 32 based on the peak line-to-line AC voltage. Also, the bleeder resistor 38 bleeds stored energy in the capacitor 32 when the overvoltage condition is over and the power system returns to normal.

Figure 4:
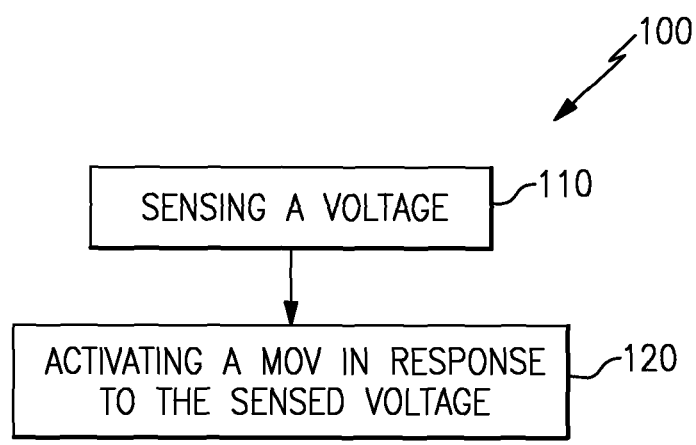
FIG. 4 shows the flow of an example method for protection against overvoltage from a generator in the FIG. 1 system.

Referring to FIG. 4, an example method 100 of absorbing overvoltage includes sensing a voltage at step 110. The voltage is provided by a generator through a bus in this example. The method 100 then selectively activates a MOV at a step 120 in response to the sensed voltage from the step 110. The MOV is configured to absorb voltages from a bus that are in excess of a threshold value. The step 110 may include actuating a switch to activate the MOV.

Features of the disclosed examples include protecting loads from an overvoltage condition without interrupting power to the loads. There is little lag between detection of the overvoltage condition and the protection, as there are no required adjustments to the generator (or other device) that provides the power. Another feature of the disclosed examples, is the ability to execute a built-in test of the surge protection device without disturbance to the system at large. More specifically, the system at large is undisturbed by a false trigger (from noise, etc.) of the surge protection device.

The preceding description is exemplary rather than limiting in nature. Variations and modifications to the disclosed examples may become apparent to those skilled in the art that do not necessarily depart from the essence of this disclosure. For example, prime mover 14 is not limited to a gas turbine engine but can be any type of engine, such as a diesel engine, a spark ignited engine, a natural gas engine, a hybrid engine, or other variety of engine or turbine known in the art. Thus, the scope of legal protection given to this disclosure can only be determined by studying the following claims.

We claim:

1. An electrical power system overvoltage protection arrangement, comprising:
    an overvoltage protection device having a fail-shorted surge protection device; and
    a variable frequency generator that provides a first percentage of total AC power to an AC power system, and a second percentage of total AC power output through a DC bus to the fail-shorted surge protection device of the overvoltage protection device when the fail-shorted surge protection device is activated,
    wherein the overvoltage protection device is configured to activate the fail-shorted surge protection device if a voltage of the power being provided to the AC power system exceeds a threshold value, the fail-shorted surge protection device configured to absorb the second percentage of the total AC power in excess of the threshold value to protect the AC power system from an overvoltage condition,
    wherein the overvoltage protection device includes:
        the DC bus having a three phase input and a DC output, wherein the DC output includes a first terminal and a second terminal;
        a discharge resistor connected to the first terminal on a first end and an intermediate node on a second end;
        a snubber diode connected to the first terminal via an anode and connected to the intermediate node via a cathode;
        a capacitor connecting the intermediate node to the second terminal;
        a bleeder resistor connected to the intermediate node at a first end and connected to the second terminal at a second end;
        a sensor circuit connecting the first terminal to the second terminal, the sensor circuit further including a gate drive output;
        a transistor switch connecting the second terminal to a first terminal of a varistor, the transistor being driven by the gate drive output, the varistor having a second terminal connected to the first terminal.

2. The electrical power system overvoltage protection arrangement of claim 1, wherein the variable frequency generator is powered by a gas turbine engine.

3. The electrical power system overvoltage protection arrangement of claim 1, wherein the capacitor slows a rate of upward change of the second percentage of the total AC power in excess of the threshold value on the variable frequency bus.

4. The electrical power system overvoltage protection arrangement of claim 1, wherein the transistor switch is a power semiconductor switch configured to selectively activate and deactivate the fail-shorted surge protection device in response to a variation of the voltage, the power semiconductor switch and the fail-shorted surge protection device are connected in series across a variable frequency bus.

5. The electrical power system overvoltage protection arrangement of claim 1, wherein the varistor comprises a metal oxide varistor.

\* \* \* \* \*